United States Patent [19]

Eckert

[11] Patent Number: 5,415,680

[45] Date of Patent: May 16, 1995

[54] MOLTEN METAL VACUUM TREATMENT AND APPARATUS

[76] Inventor: C. Edward Eckert, 260 Lynnann Dr., New Kensington, Pa. 15068

[21] Appl. No.: 973,786

[22] Filed: Nov. 9, 1992

[51] Int. Cl.⁶ .............................................. C22B 9/04
[52] U.S. Cl. ........................................ 75/405; 75/508; 75/647; 75/678; 266/208
[58] Field of Search ................. 75/508, 647, 678, 405; 73/19.07; 266/208; 55/523

[56] References Cited

U.S. PATENT DOCUMENTS

| | | | |
|---|---|---|---|
| 2,809,107 | 10/1957 | Russell | 75/405 |
| 4,299,627 | 11/1981 | Shinohara et al. | 419/8 |
| 5,031,444 | 7/1991 | Doutre et al. | 73/19.07 |
| 5,167,698 | 12/1992 | Miyagawa et al. | 266/208 |

FOREIGN PATENT DOCUMENTS

| | | | |
|---|---|---|---|
| 450544 | 9/1991 | European Pat. Off. | |
| 2923321 | 8/1979 | Germany | |
| 829777 | 3/1960 | United Kingdom | 266/208 |
| 431962 | 11/1974 | U.S.S.R. | |

Primary Examiner—Melvyn J. Andrews

[57] ABSTRACT

Disclosed is a method and apparatus of treating molten metal for reducing the amount of gaseous or volatile material contained therein. The method comprises providing a body of molten metal and contacting the molten metal with a porous member having a porous surface resistant to penetration with the molten metal. The porous member is subjected to reduced pressure to impose a reduced pressure zone on the molten metal contacting the porous surface thereby removing the gaseous material from the molten metal through the porous member.

14 Claims, 3 Drawing Sheets

MOLTEN METAL VACUUM TREATMENT AND APPARATUS

BACKGROUND OF THE INVENTION

This invention relates to reduced pressure treatment of molten metal such as molten aluminum to reduce the amount of gaseous and volatile material contained therein.

Molten metal contains dissolved and suspended impurities. Molten aluminum, for example, contains dissolved impurities such as alkali and alkali earth metals or elements such as hydrogen.

As used herein, the term molten metal, e.g., molten aluminum, is intended to mean the molten metal and its alloys.

Because of its atomic size, hydrogen has significant solubility in molten metal and in particular in molten aluminum. In high purity molten aluminum, hydrogen solubility at slightly above its melting temperature is about 0.9 cc/100 gm aluminum at standard temperature and pressure. However, upon solidification of the aluminum, hydrogen solubility is decreased by a factor of about 10. The solubility difference between molten and solid aluminum results in hydrogen gas forming, a portion of which is retained or trapped in the solid aluminum. The trapped hydrogen gas results in porosity in the aluminum ingot that is very detrimental to properties of products fabricated therefrom. Thus, it is highly desirable to remove dissolved hydrogen or other volatile elements such as sodium, potassium or calcium, etc., from molten aluminum to a very low level in order to reduce porosity in the resulting ingot and its attendant problems.

Hydrogen has been removed from molten aluminum by treatment with various gases where such gases are injected into the melt in small bubble form. Hydrogen in the melt migrates to the gas bubble and is carried out of the melt with the gas bubble. However, to reduce the hydrogen to low levels requires the use of large quantities of gas that can result in the generation of skim.

Russian disclosure 431,962 discloses that large dimension castings of improved quality can be made in metal molds by vacuum degassing each separate section of the mold after it is filled with melt. The sections of the mold are air-tight and connected with the working volume of the mold by a gas-permeable component. Air and gas are drawn through the gas-permeable component and vacuum is maintained at a level to remove gaseous substances but excludes drawing liquid metal into the pores of the gas permeable component.

European Application 91105145.6 discloses a vacuum degassing method and an apparatus therefor wherein a vacuum pump is used to draw gas from a melt or gas produced by reaction at the interface between the melt and a porous member, through the porous member to the side of the porous member not in contact with the melt and kept under vacuum. According to this disclosure, materials used for the porous member are metal oxides or other ceramic compounds (non-oxides) and mixtures thereof such as $Al_2O_3$, MgO, CaO, $SiO_2$, FeO, $Cr_2O_3$, BN and $Si_3N_4$. However, one problem with such ceramic materials is that they are subject to thermal shock which leads to degradation. Materials such as silica are reactive with molten metal such as molten aluminum and this leads to severe contamination. Further, many of these materials are costly and difficult to fabricate. Machining of such material is difficult and grain fracture can occur which leads to difficulty in controlling pore size. This has the disadvantage that it greatly interferes with the efficiency and effectiveness of the porous member.

The present invention overcomes these problems by providing a porous member that is highly resistant to thermal shock, easily fabricated and highly resistant to attack by molten metal such as molten aluminum. The present invention provides a method and apparatus for removing dissolved gases such as hydrogen and volatile materials which can include sodium, calcium, potassium, zinc and magnesium from molten metal such as molten aluminum.

SUMMARY OF THE INVENTION

A principal object of this invention is to remove gaseous and volatile material from molten melts such as molten metal by applying a vacuum to the melt through a porous member.

Another object of this invention is to remove gases such as hydrogen and the like from molten metal such as aluminum.

And yet another object of this invention includes removing hydrogen from molten aluminum by applying reduced pressure through a porous carbon or a preoxidized sintered metal member in contact with the molten aluminum.

A further object of this invention is to provide an apparatus employing a porous carbon or porous metal member for removing dissolved gases from molten metal such as molten aluminum.

These and other objects will become apparent from the specification, drawings and claims appended hereto.

In accordance with these objects, a method and apparatus are provided for treating molten metal to reduce the amount of gaseous or volatile material contained therein. The method comprises providing a body of molten metal and contacting the molten metal with a porous carbon or a porous metal member having a porous surface resistant to attack and penetration by the molten metal. The porous member is subjected to reduced pressure to impose a reduced pressure zone on the molten metal contacting the porous surface, thereby removing the gaseous or volatile material from the molten metal through the porous member.

DETAILED DESCRIPTION OF THE EMBODIMENTS

Figure 1:
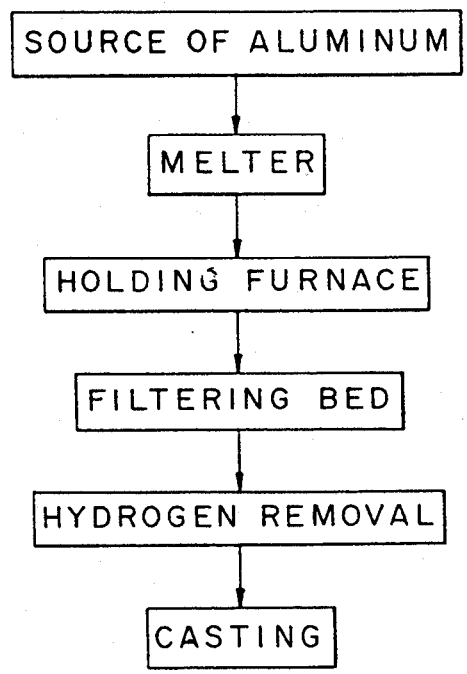
FIG. 1 is a flow chart showing steps in treating molten metal prior to casting.

In the process of the invention, a source of metal is provided and melted in a melter (FIG. 1). The melted metal, e.g., aluminum, may be transferred, for example, to a holding furnace before being transferred to a fluxing unit prior to filtering to remove particles of skim, suspended solids or molten salt particles, as desired. The molten metal preferably is then subjected to removal of gases or volatiles. That is, in the present invention, it is preferred that the molten metal be subjected to a gaseous or volatile material removal treatment just prior to the casting step. It will be understood that the molten metal may be subjected to the removal of such volatile or gaseous material prior to the filtering or other such steps, but it is believed that the removal step is more effective when applied just before the casting step, particularly for molten aluminum. The use of aluminum as used herein is meant to include aluminum and its alloys and composites of aluminum.

While the invention is described particularly with respect to molten aluminum, it will be understood that it has application to other molten metals such as steel, copper, magnesium, titanium, zinc, alloys of such metal and molten metal composites such as molten aluminum composites. By molten aluminum composite is meant molten aluminum which contains a dispersed solid phase such as oxides and carbides. Further, while the invention is described particularly with reference to removal of gaseous or volatile material from molten aluminum, it will be appreciated that it has application to removal of gases from molten metal such as oxygen from molten copper and alloys thereof such as bronze and brass. Further, the invention has application to removal of hydrogen from molten zinc or magnesium.

In one aspect of the present invention, molten aluminum is contacted with the porous member. One side or surface of the porous member is located in the molten aluminum and is in contact with molten aluminum. Another side is subjected to reduced pressure or vacuum in order to subject the molten metal to a reduced pressure. That is, the portion of the metal in contact with the carbon membrane is exposed to a pressure less than atmospheric to enable removal of gases or volatiles therefrom. The porous member should be resistant to attack by the molten metal. For molten aluminum, the porous member is comprised of carbon, preferably graphite, or preoxidized porous metal such as preoxidized sintered stainless steels, e.g., austenitic, ferritic or martensitic stainless steels. Further, molybdenum or titanium may be used in porous form. Suitable stainless steels can include alloys 430, 410, 440, 316, 304 and 302. Sintered stainless steel may be preoxidized by heating to about 1750° C. in an oxidizing atmosphere. Low nickel and high chrome steels, e.g., the 400 series stainless steels, respond particularly well to the preoxidation treatment. Other heat resistant alloys containing titanium and aluminum suitable for use with molten aluminum include Inconel X750 and Hastelloy C. The porous member may be comprised of mixtures of these materials or layers of these materials.

By carbon as used herein is meant to include all forms of carbon including graphite and carbon composites, e.g., mixtures of carbon and clays or binders.

Further, the porous member should be selected to resist penetration of molten metal into the submerged side of the porous member when reduced pressure is applied to the other side. The porous member is selected to be resistant to attack by the molten metal, as noted, and to be resistant to penetration by the molten metal at reduced pressure. The reduced pressure is selected to enable removal of gases such as hydrogen from the molten metal without causing penetration of the porous member by the molten metal to an extent which substantially prevents gas removal.

Penetration of the porous member is dependent on the degassing or vacuum pressure and the metallostatic pressure the pressure resulting from the "weight" of the molten metal). Penetration as a result of the vacuum pressure and metallostatic pressure is opposed by the capillary counter pressure exerted by the porous member. Thus, when the capillary counter pressure exceeds the vacuum pressure and the metallostatic pressure, penetration of the porous member will not occur. On this basis, it is possible to select membranes or porous members which will not permit penetration by the molten metal at given vacuum levels or reduced pressures and which will permit removal of gases or volatiles from the molten metal.

The effective pressure required to remove hydrogen, for example, from molten aluminum is the sum of the absolute pressure and the metallostatic pressure. The metallostatic pressure has the effect of increasing the effective pressure. The sum of the two pressures has the effect of increasing the equilibrium hydrogen concentration and decreasing the amount of hydrogen removed at a given effective pressure. Thus, it will be seen that in the present invention, it is important to minimize the depth of the surface of the porous carbon member in contact with the molten aluminum to enhance removal of hydrogen, for example.

TABLE 1

| Pressure mm (Hg) | Membrane Immersion Depth (inches) | | | | |
|---|---|---|---|---|---|
| | 0.1 | 0.5 | 1.0 | 2.0 | 3.0 |
| 0.1 | 0.028 | 0.057 | 0.080 | 0.112 | 0.137 |
| 0.5 | 0.037 | 0.062 | 0.083 | 0.115 | 0.139 |
| 1.0 | 0.045 | 0.068 | 0.088 | 0.118 | 0.142 |
| 5.0 | 0.089 | 0.102 | 0.116 | 0.140 | 0.161 |
| 10.0 | 0.122 | 0.132 | 0.144 | 0.164 | 0.182 |

Table 1 shows the effect of depth and illustrates the invention by showing that increasing depth of the surface in contact with molten metal decreases the amount of hydrogen removed for a set pressure. Further, Table 1 shows that for relatively pure aluminum, dissolved hydrogen can be removed to a concentration of 0,088 cc $H_2$/100 gms of aluminum, using a pressure of 1 mm Hg when the surface of the porous member in contact with the molten aluminum is submerged about 1 inch.

It will be appreciated that it is desirable to maximize the amount of hydrogen removed at a given pressure. Thus, carbon or graphite membranes are selected so as to preclude metal intrusion while operating at reduced pressure to remove gas. There is a certain pressure or intrusion pressure at which molten metal will penetrate the pores of a member. When the intrusion pressure exceeds the capillary pressure at the membrane surface in contact with the molten metal, then penetration of the membrane can occur. The intrusion pressure as used herein is equal to atmospheric pressure plus metal pressure minus the vacuum or reduced pressure. Accordingly, at atmospheric pressure (760 mm Hg), and a reduced pressure of 1 mm Hg and pressure due to molten aluminum at 1 inch (4.32 mm Hg), the intrusion pressure is 763.3 mm Hg or 1035.8 m/cm².

The maximum pore diameter of a membrane can be selected using the intrusion pressure. The surface tension, $\sigma$, of high purity aluminum on graphite is 850 dynes/cm at 1300° F, and the contact angle on graphite is 140°. The radius, r, of the pore in graphite is determined by the equation:

$$r = \frac{-2\sigma \cos}{Pg} = \frac{-2(850)(-0.766)}{(1035.8)(981)} =$$

$$\frac{-2(850)(-0.766)}{(1035.8)(981)} = 0.0013 \text{ cm}$$

where P is the intrusion pressure and g is the gravity constant. Thus, in this example, the pore diameter for graphite suitable for use with molten aluminum is about 26 microns at an immersion a depth of about 1 inch and a vacuum pressure of 1 mm Hg. For purposes of the present invention, the maximum pore diameter that can be used is determined by the contact angle and the surface tension. For porous graphite, the pore diameter can be in the range of 1 to 250 microns, preferably 5 to 100 microns and typically 5 to 50 microns. For preoxidized sintered stainless steel, the pore diameter is preferably in the range of 0.2 to 300 microns.

Resistances are encountered that determine the rate at which gases or volatiles can be removed from molten metal. For removal of gases such as hydrogen from molten aluminum, these include the transport of hydrogen through the liquid phase, removal of hydrogen at the membrane/molten metal interface, flow of hydrogen gas through the membrane and removal of hydrogen from the system producing the vacuum or reduced pressure. For purposes of the present invention, hydrogen is removed more efficiently when the surface area of the membrane is maximized and the molten metal is agitated.

Figure 2:
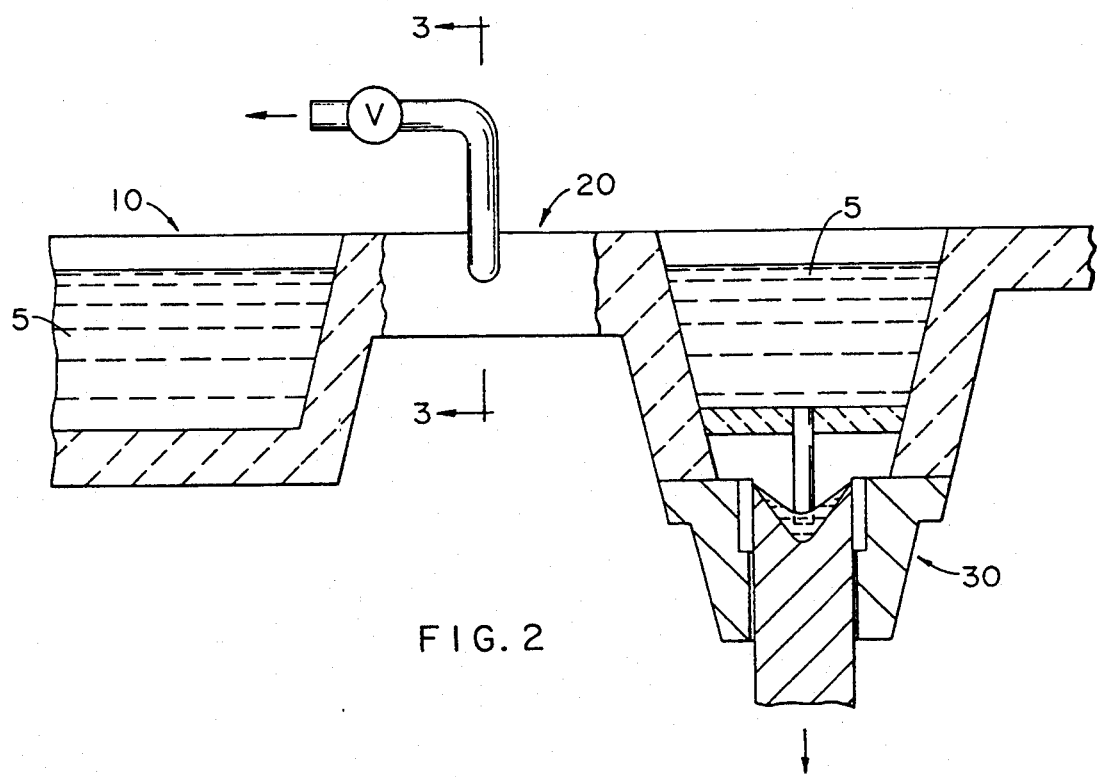
FIG. 2 is a side view illustrating a filtering bay and casting bay with a vacuum treatment facility located therebetween for removing gaseous and volatile material.
Figure 3:
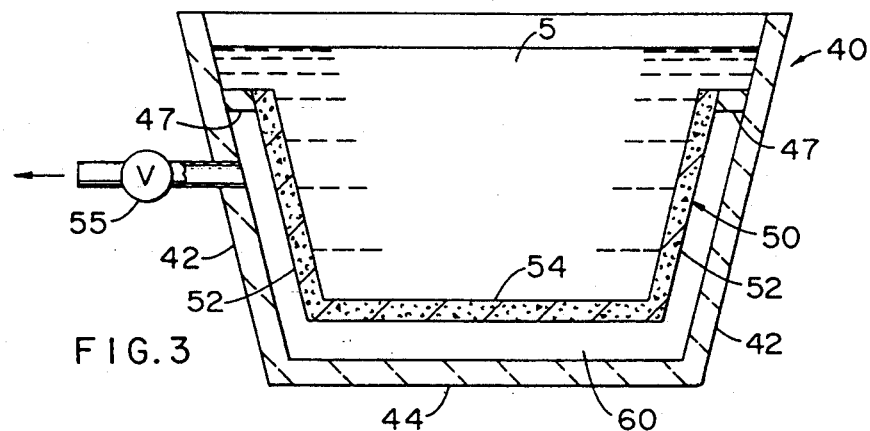
FIG. 3 is a view along the line 3—3 of FIG. 2 showing a cross sectional view of a trough employing a porous member enabling reduced pressure on molten metal.
Figure 4:
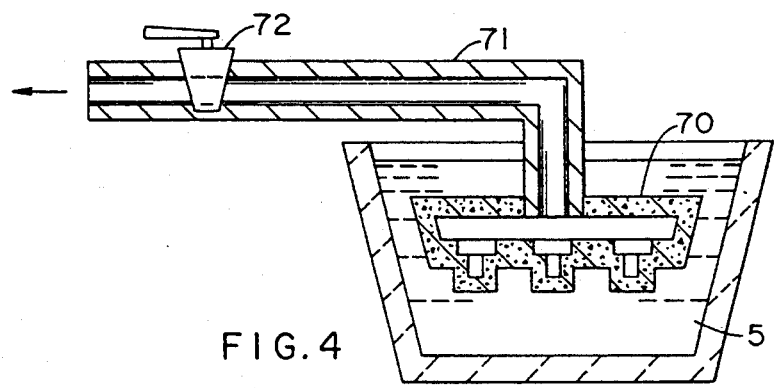
FIG. 4 is a cross-sectional view of a trough showing a porous member immersed in molten metal enabling reduced pressure on the molten metal.
Figure 5:
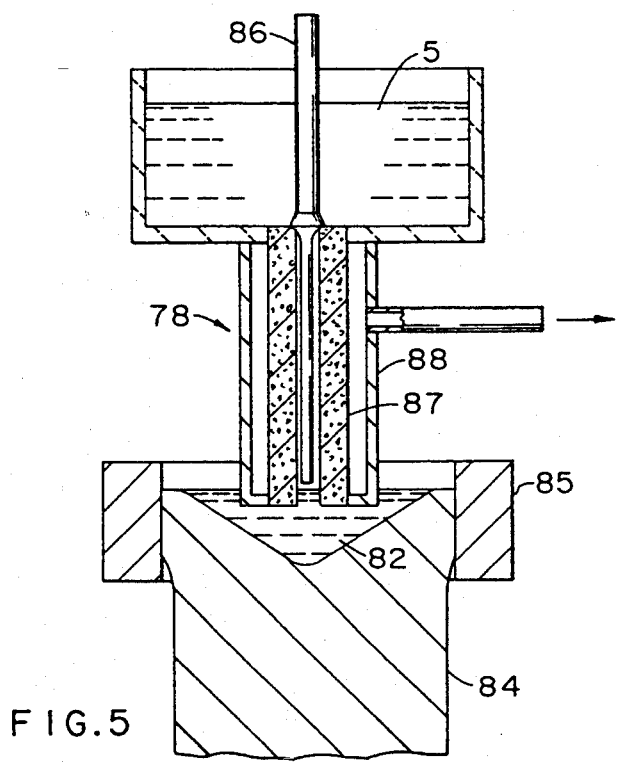
FIG. 5 is a cross-sectional view showing a downspout or conduit between a container of molten metal and a crater of an ingot.

FIG. 2 illustrates the location of gas removal system 20 in accordance with the invention between a filtering operation 10 and a casting step 30. That is, molten metal 5 is passed from the filtering or other operation 10 through a vacuum treatment facility 20 to the ingot casting step 30. The vacuum treatment facility can comprise a generally trough-shaped section 40 (see FIG. 3) which permits the flow of metal from the filtering step, for example, to the casting step. In FIG. 3, trough section 40 comprises outer walls 42 and bottom 44. Within trough section 40 is a second porous trough section 50 fabricated from porous components as described, the porous trough section having walls 52 and bottom 54. Second trough section 50 is attached to trough section 40 at 47 so as to define a cavity 60 which can be subjected to a reduced pressure, thereby imparting a vacuum pressure on the molten metal as it passes along trough 50. As noted earlier, it is preferred to keep trough 50 shallow so as to maximize the pressure differential across its thickness and minimize the pressure resulting from the weight of the molten metal. A vacuum or reduced pressure, e.g., less than atmospheric, can be applied through vacuum valve 55. A porous member for subjecting the molten metal to vacuum or reduced pressure can be used, as shown in FIG. 4, where the porous member can be lowered into the body of a molten metal. Vacuum or reduced pressure can be applied through valve 72 and along solid or non-porous pipe 71 which extends under molten metal 5. Porous member 70 can be fabricated from any porous carbon material, as noted, which enables application of reduced pressure to the molten metal without causing penetration of the pores. It will be noted that vacuum element 70 may be used in conjunction with vacuum element 50 to maximize removal of gases and volatiles. While the invention has been illustrated using trough inserts, it will be understood that the invention is not limited thereto. That is, vacuum may be applied to a melt by stirring or rotating impellers where the impeller is formed from porous graphite. The parts of the impeller located under the melt surface can be hollow and formed of a porous material and reduced pressure applied down the shaft of the impeller.

In the embodiments shown, agitation may be applied to aid transportation of the gas through the melt to the surface of the porous member. Agitation may be achieved by use of impellers or electromagnetic stirring.

Figure 6:
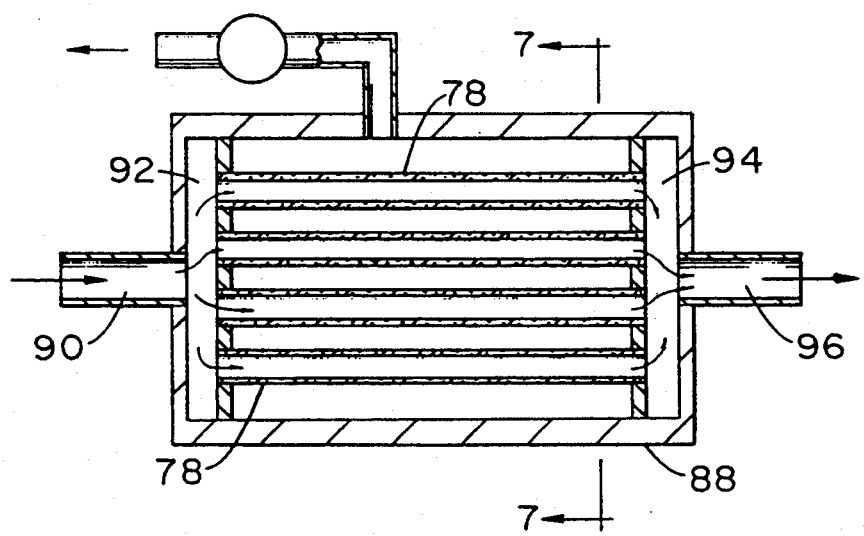
FIG. 6 is a cross-sectional view of a capsule having multiple porous tubes therein for transferring molten metal therethrough which enables removal of gaseous or volatile material therefrom by vacuum applied to the canister.
Figure 7:
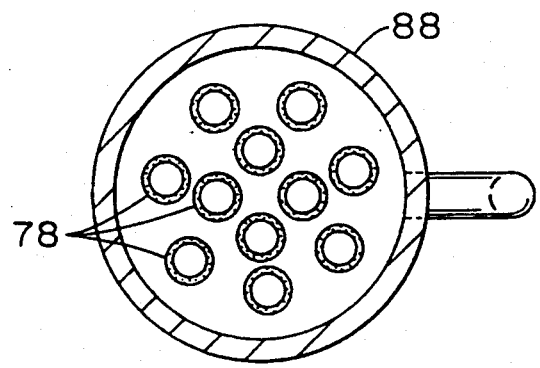
FIG. 7 is a view a long the line 7—7 of FIG. 6.

In another embodiment of the invention, a downspout or conduit 78 may be provided between the molten metal 5, e.g., molten aluminum, to be cast and crater 82 of ingot 84 in mold 85. Rod 86 is provided to control the rate of flow of molten metal to crater 82. Rod 86 may lowered to stop the flow of molten metal to crater 82. Downspout 78 comprises a hollow cylinder 84 fabricated from a porous material such as porous carbon or porous preoxidized sintered metal. A second cylinder 88 of metal or like material is provided surrounding hollow cylinder 84. Cylinder 88 is connected to a vacuum system for purposes of applying a reduced pressure to porous cylinder 84. In this embodiment, volatiles or gases such as hydrogen can be removed efficiently, for example, from molten aluminum as it is transferred to the casting station. While downspout or conduit 78 is shown being used in the vertical position, it has application in the horizontal or any other such position. While only a single downspout is shown, it will be appreciated that several of such downspouts may be contained within one outer cylinder 88 to apply vacuum thereto. Several downspouts are effective when it is desired to remove the gases from the molten metal to a very low level. For example, in FIG. 6, molten metal 5 enters capsule or cylinder 88 at 90 and is distributed in plenum 92 before entering porous members 78. From porous members 78 the molten enters second plenum 94 before exiting at 96. Reduced pressure is applied through the vacuum system to cylinder 88 and thus gaseous or volatile material is removed as the molten metal passes therethrough.

With respect to aluminum, the present invention has the advantage that it can reduce hydrogen for foundry alloys to less than 0.2 cc/100 gms aluminum; hydrogen from hot rolled aluminum can be reduced to less than 0.15 cc/100 gms; and for aluminum alloys for aerospace applications, hydrogen can be reduced to less than 0.1 cc/100 gms aluminum.

Sintered tungsten or sintered molybdenum can be used for porous members when it is desired to remove gaseous or volatile material from molten steel.

With respect to molten metal composites, such as molten aluminum composites, the present invention has the advantage that gases or volatile material can be removed therefrom without removing the dispersed phase which can occur when fluxing gases are used.

While the invention has been described in terms of preferred embodiments, the claims appended hereto are intended to encompass other embodiments which fall within the spirit of the invention.

What is claimed is:

1. An improved method for treating a molten metal comprising molten aluminum for reducing the amount of gaseous hydrogen or volatile material contained therein, the method comprising:
   (a) providing a body comprising molten aluminum;
   (b) contacting said molten aluminum with a porous member comprised of a material selected from carbon having a pore diameter in the range of 5 to 50 microns, and preoxidized stainless steel, the member resistant to attack by said molten aluminum and having a porous surface having a capillary counter pressure to resist penetration by said molten aluminum, said molten aluminum providing a metallostatic pressure on said porous member; and
   (c) subjecting said porous member to reduced pressure in the range of about 0.1 to 5 mm Hg to impose a reduced pressure zone on said molten aluminum contacting said porous surface, the reduced pressure and metallostic pressure of the molten aluminum being less than the capillary counter pressure to avoid intrusion of said molten aluminum into pores of said porous member thereby removing said gaseous hydrogen or volatile material from said molten aluminum through said porous member.

2. The method in accordance with claim 1 wherein said porous member comprises porous graphite.

3. The method in accordance with claim 1 wherein said porous member comprises preoxidized sintered stainless steel.

4. The method in accordance with claim 3 wherein said preoxidized sintered stainless steel is a stainless steel alloy selected from 430, 410, 440, 316, 304 and 302.

5. The method in accordance with claim 1 wherein said porous member comprises porous graphite which has a pore diameter in the range of 5 to 50 microns.

6. The method in accordance with claim 1 wherein said porous member is comprises preoxidized stainless steel having a pore diameter in the range of 0.2 to 300 microns.

7. The method in accordance with claim 1 wherein the molten metal is a molten aluminum composite.

8. An improved method for treating molten aluminum for reducing the amount of hydrogen contained therein, the method comprising:
   (a) providing a body of molten aluminum;
   (b) contacting said molten aluminum with a porous carbon member having a porous surface having a capillary counter pressure to resist penetration by said molten aluminum, said member having a pore diameter in the range of 5 to 50 microns, said molten aluminum providing a metallostatic pressure on said porous member; and
   (c) subjecting said porous member to reduced pressure in the range of about 0.1 to 5 mm Hg to impose a reduced pressure zone on said molten aluminum contacting said porous surface, the reduced pressure and metallostatic pressure of the molten aluminum being less than the capillary counter pressure to avoid intrusion of said molten aluminum into pores of said porous member, thereby removing hydrogen from said molten aluminum through said porous carbon member.

9. An improved method for treating molten steel to remove gaseous or volatile material therefrom, the method comprising:
   (a) providing a body of molten steel;
   (b) contacting said molten steel with a porous metal member comprised of a sintered metal selected from molybdenum and tungsten, the member having a porous surface resistant to penetration by said molten steel; and
   (c) subjecting said porous member to reduced pressure to impose a reduced pressure zone on said molten metal contacting said porous surface thereby removing said gaseous or volatile material from said molten steel through said porous metal member.

10. An improved method for treating molten copper and alloys thereof to remove gaseous or volatile material therefrom, the method comprising:
    (a) providing a body of molten metal comprising copper;
    (b) contacting said molten metal with a porous member comprised of a material selected from preoxidized stainless steel, molybdenum and tungsten, the member having a porous surface resistant to attack and penetration by said molten metal; and
    (c) subjecting said porous member to reduced pressure to impose a reduced pressure zone on said molten metal contacting said porous surface thereby removing gaseous or volatile material from said molten metal through said porous member.

11. A conduit for transferring molten aluminum and removing gaseous or volatile material therefrom during said transferring, the conduit comprised of:
    (a) a trough shaped channel for transferring said molten aluminum, the channel having a porous member having a first planar surface thereof comprising a bottom wall or sidewall in said channel adapted to be covered by molten aluminum being transferred in said trough, said molten aluminum providing a metallostatic pressure on said porous member, the porous member having a second surface adapted to be exposed to a reduced pressure in the range of 0.1 to 5 mmHg, the porous member comprised of a porous material selected from carbon having a pore diameter in the range of 5 to 50 microns, and preoxidized stainless steel, the porous material having a capillary counter pressure to resist penetration by molten aluminum, the reduced pressure and metallostatic pressure of the molten aluminum on said porous member being less than said capillary counter pressure; and
    (c) means on said channel for attaching to a vacuum system for maintaining said reduced pressure on said second surface to remove said gaseous or volatile material during transferring of the molten aluminum.

12. The conduit in accordance with claim 11 wherein said member is comprised of carbon.

13. The conduit in accordance with claim 11 wherein said porous material is comprised of preoxidized stainless steel.

14. A capsule for transferring molten metal therethrough for purposes of removing gaseous or volatile material therefrom, the capsule comprising:
    (a) a first entrance end wall having a tube mounted thereon for flowing molten aluminum to said capsule;

(b) a first exit end wall having a tube mounted thereon for flowing molten aluminum from said capsule;

(c) a side wall connected to and sealed to said end wall to make a leak-proof capsule;

(d) a first plenum wall disposed inside said capsule defining a first plenum between said first entrance wall and said first plenum wall;

(e) a second plenum wall disposed inside said capsule defining a second plenum between said first exit wall and said second plenum wall;

(f) at least one opening in said first plenum wall and a corresponding opening in said second plenum wall;

(g) a tube connecting the opening in said first plenum wall to the opening in said second plenum wall to flow molten metal from said first plenum to said second plenum, the tube comprised of a material selected from carbon, preoxidized stainless steel, molybdenum and tungsten, the member resistant to attack by said molten metal and having a porous surface resistant to penetration by said molten metal; and (h) means for applying vacuum to said tubes when molten metal is flowed therethrough for purposes of removing gaseous or volatile material from the molten metal as it is flowed through said tubes.

* * * * *